Dec. 29, 1936.  B. NAGY  2,066,071
BOTTLE CROWN ADHESIVE FEEDING DEVICE
Filed Jan. 31, 1935   4 Sheets-Sheet 1

INVENTOR.
BY Berthold Nagy
James Harrison Bowen
ATTORNEY.

Dec. 29, 1936.  B. NAGY  2,066,071
BOTTLE CROWN ADHESIVE FEEDING DEVICE
Filed Jan. 31, 1935  4 Sheets—Sheet 2
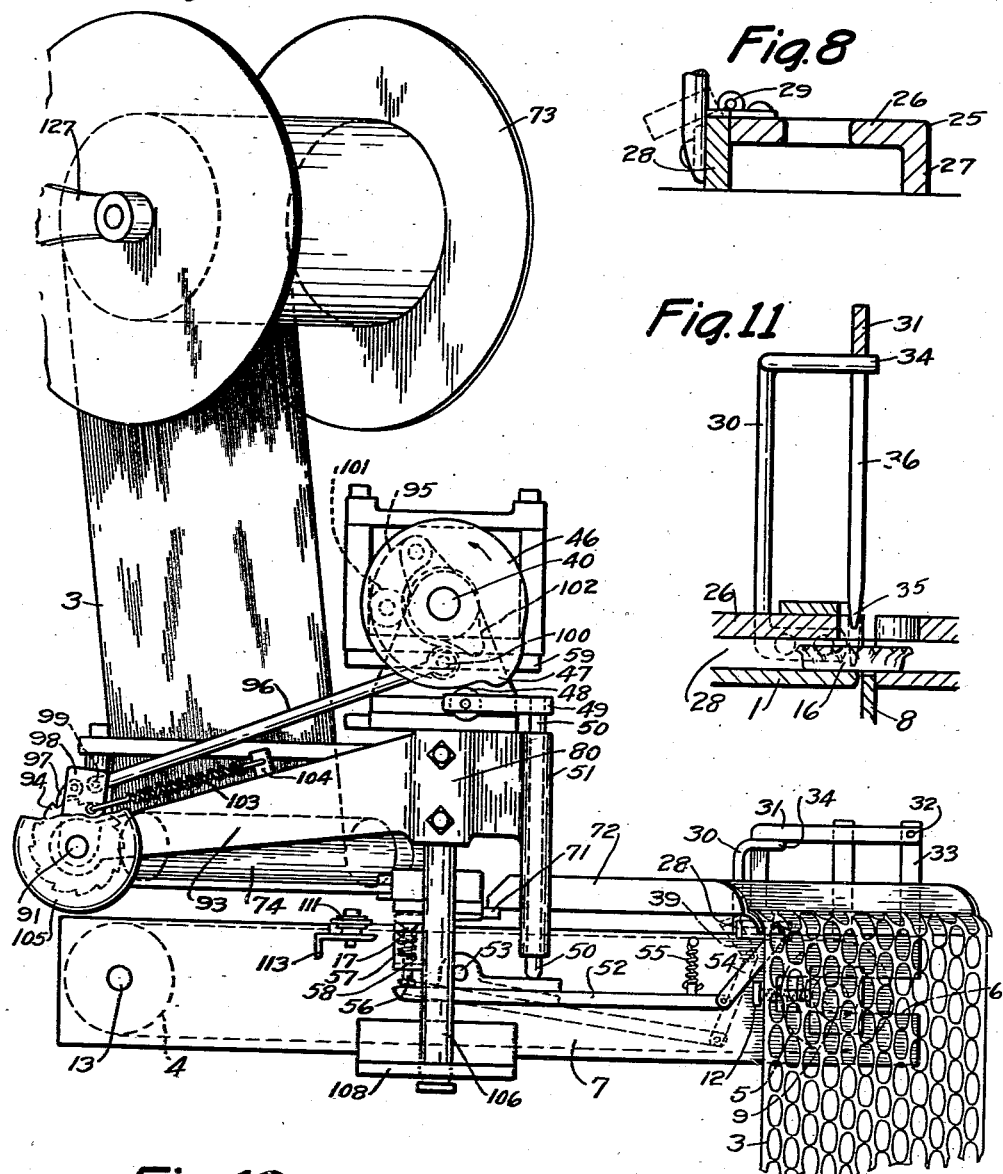
INVENTOR.
*Berthold Nagy*
BY
*James Harrison Bowen*
ATTORNEY.

Dec. 29, 1936.  B. NAGY  2,066,071
BOTTLE CROWN ADHESIVE FEEDING DEVICE
Filed Jan. 31, 1935  4 Sheets-Sheet 3
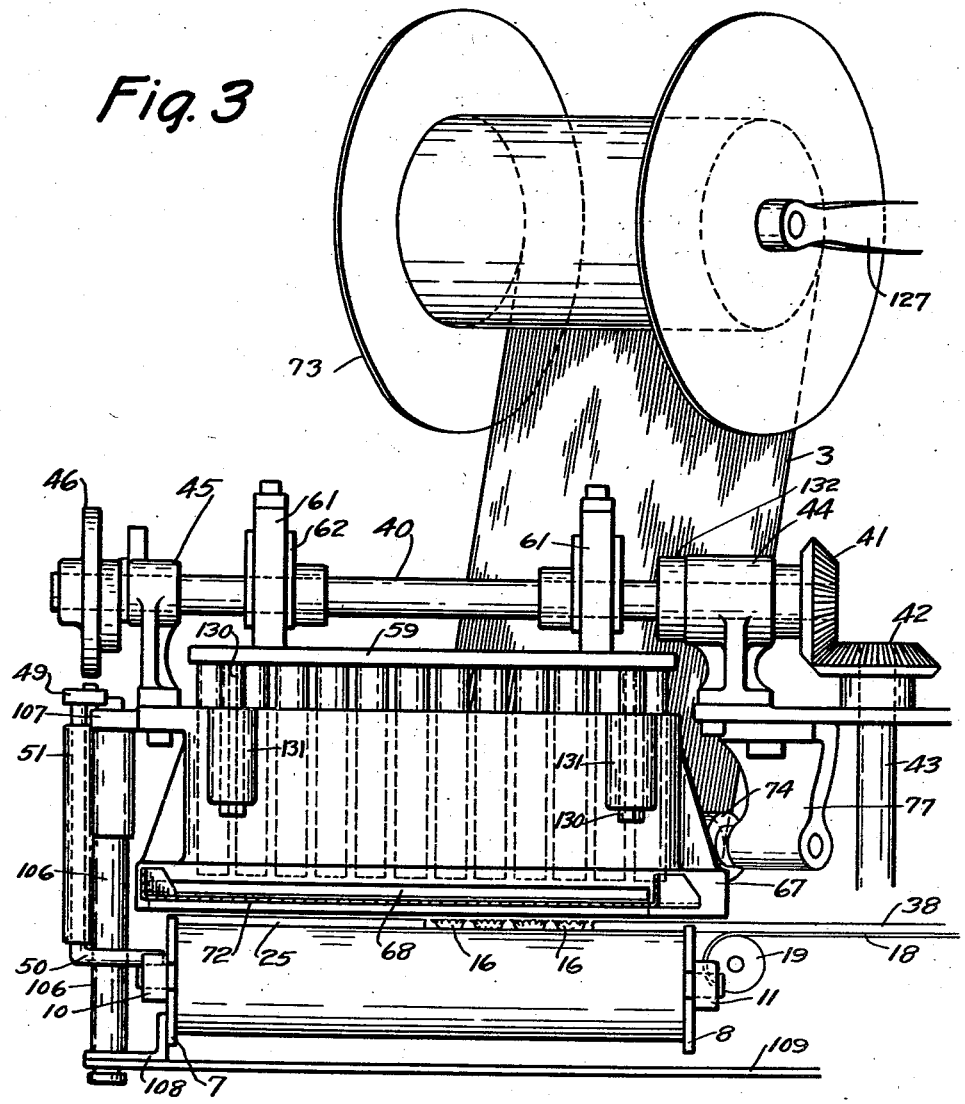
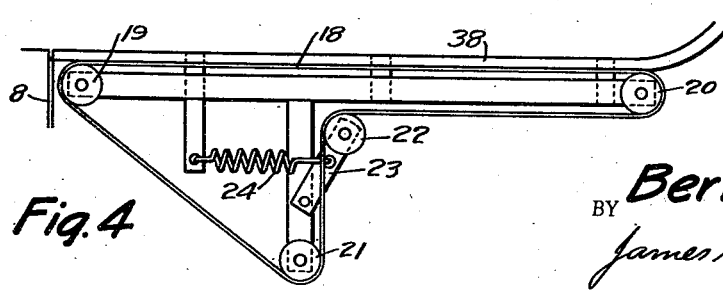
INVENTOR.
Berthold Nagy
BY James Harrison Bower
ATTORNEY.

Dec. 29, 1936.   B. NAGY   2,066,071
BOTTLE CROWN ADHESIVE FEEDING DEVICE
Filed Jan. 31, 1935   4 Sheets-Sheet 4
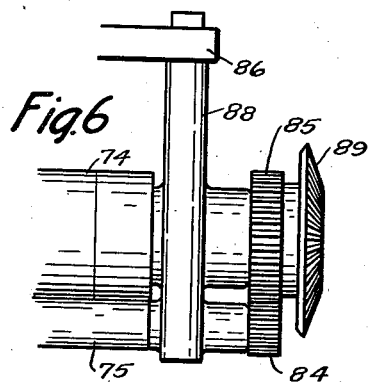
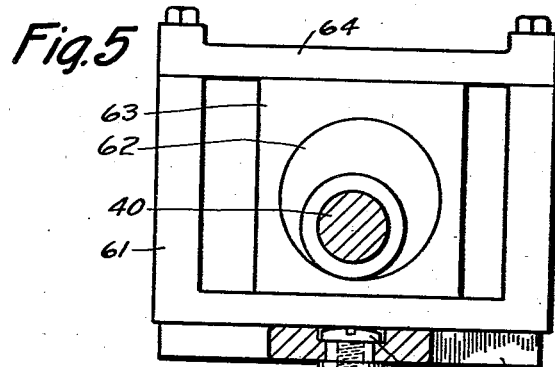
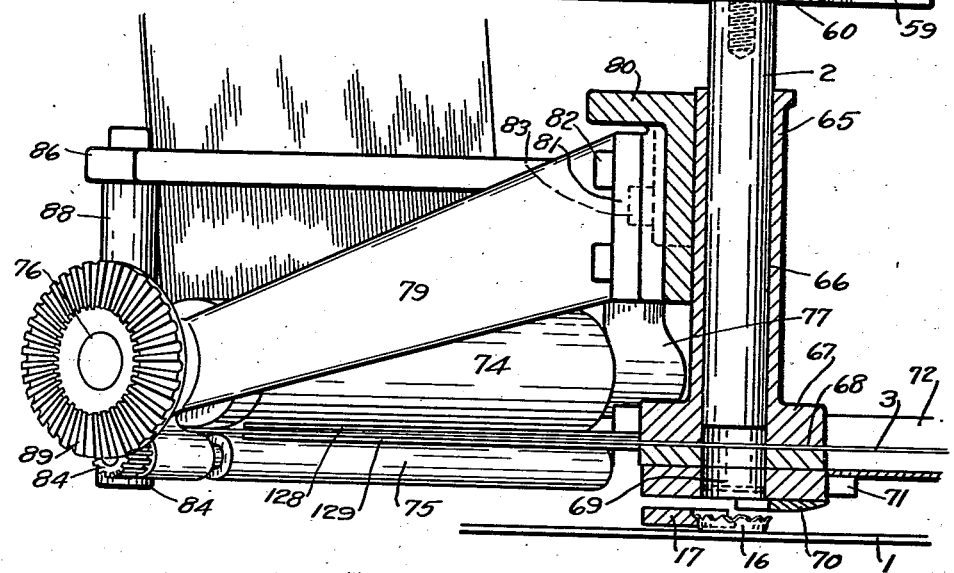
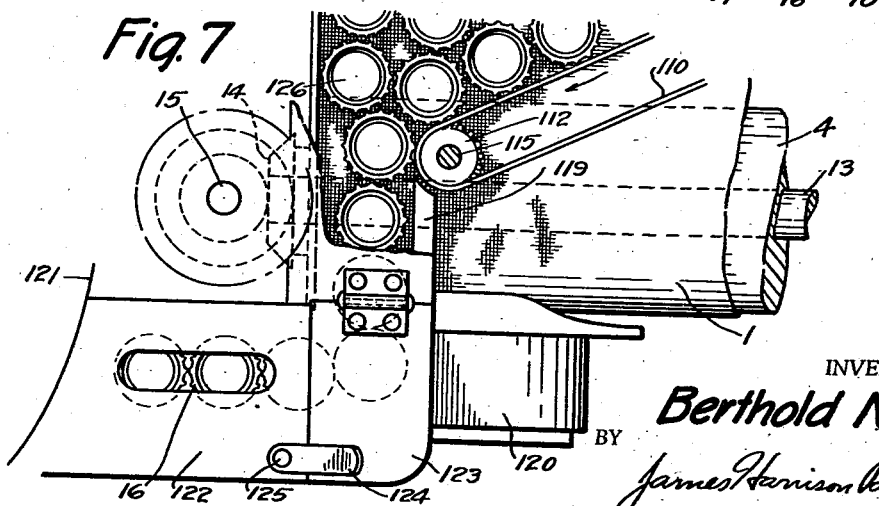
INVENTOR.
Berthold Nagy
BY James Harrison Bowen
ATTORNEY.

Patented Dec. 29, 1936

2,066,071

UNITED STATES PATENT OFFICE 2,066,071

BOTTLE CROWN ADHESIVE FEEDING DEVICE

Berthold Nagy, Ridgewood, N. Y.

Application January 31, 1935, Serial No. 4,269

23 Claims. (Cl. 113—80)

The purpose of this invention is to provide a machine for placing adhesive material in sheet form or otherwise in bottle crowns before the crowns are fed to an assembling machine in which the cork discs are installed therein.

This invention is a machine adapted to receive bottle crowns from a crown feeding device, align the crowns in a row, feed them to a comb or toothed bar below reciprocating plungers, hold them in these positions until the plungers move downward stamping liners out of a sheet of material and placing said liners in the crowns, and then feed said crowns to an assembling machine. The machine contains a roll of relatively thin adhesive material in sheet form and means intermittently feeding said material from the roll to positions below the plungers. The machine is also provided with an automatic trip for releasing the crowns from the position below the plungers after the liners have been placed in the crowns, and at the same time releasing another row of crowns so that they may travel to the receiving position below the plungers.

This invention is an attachment adapted to be used in combination with the bottle cap or crown assembling machine of my prior Patents Numbers 1,932,525 and 1,931,294 and also of the machine shown in my co-pending application with the Serial Number 686,497. This device replaces the glue feeding apparatus in my co-pending application with the Serial Number 744,940.

The co-pending application on the glue feeding device with the Serial Number 744,940 was a step in advance in glue feeders, and it was thought the objections to glue feeders of many different types had been overcome, however it has been found desirable to use a rosin paper which may be obtained in relatively large sheets in rolls, or any adhesive in sheet form and this device stamps pieces of the proper size from the sheets, and drops them into the crowns, and the crowns are then fed to the assembling machine where the heat supplied to the machine melts the adhesive, and as the cork discs are forced into the crowns under pressure the pieces of adhesive material positively cement the corks in the crowns or caps. The difficulties encountered in attempting to feed liquid glue or glue in any other form are, therefore, completely eliminated as these pieces of adhesive material may be stamped from the sheets and directly fed into the crowns with one operation so that the action is absolutely positive.

The object of the invention is, therefore, to provide a device which may be considered as an attachment to a bottle crown assembling machine which places adhesive material in sheet form in the crowns before the crowns enter the assembling machine.

Another object is to provide a device for placing an adhesive in sheet form in bottle crowns which aligns the crowns with the dies for stamping out the adhesive so that the adhesive may be fed directly to the crowns without coming in contact with any other object or material.

Another object is to provide a device for placing an adhesive in sheet form in bottle crowns which is provided with means for holding the crowns to prevent more than the exact number of crowns desired for each operation entering the device.

Another object is to provide a device for feeding adhesive liners into bottle crowns wherein the liners are stamped from a sheet of material in which the sheet of material is intermittently fed as the liners are stamped therefrom.

A further object is to provide a device for feeding adhesive liners into bottle crowns which stamps the liners from a sheet of material in which the material is positioned in relation to the stamping means so that the greatest area thereof may be utilized.

And a still further object is to provide a device for placing adhesive in sheet form in bottle crowns which is of a simple and economical construction.

With these ends in view, the invention embodies a horizontally positioned conveyor of a comparatively short length, a toothed bar extending across said conveyor about midway of the length thereof adapted to receive and hold bottle crowns passing along the conveyor, a plurality of plungers positioned above and centered to correspond with bottle crowns held in said toothed bar, a slot between said plungers and crowns through which a sheet of adhesive material may pass from which said plungers stamp liners which may be fed directly into said crowns, a feeding conveyor adapted to feed crowns into a trough extending across said former conveyor, an automatic trip adapted to raise said toothed bar to release the crowns held thereby, and at the same time adapted to open one side of said trough to permit the escape of crowns held therein, a trigger preventing crowns entering said trough while the side thereof is opened, means feeding the crowns after being released by said toothed bar to a feeder of an assembling machine, means supporting a roll containing a sheet of material from which said crowns are stamped, and means feeding said sheet of material with an intermittent movement.

Other features and advantages of the invention will appear from the following description, taken in connection with the drawings, wherein:

Figure 2 is a view showing a side elevation of the machine, also with parts broken away and parts omitted.

Figure 3 is a view showing a front elevation, also having parts omitted and parts broken away.

Figure 4 is a detail showing a feeding conveyor by which the crowns are supplied to the trough extending across the conveyor of this machine.

Figure 5 is a cross section through the machine showing one of the plungers, and also the material feeding rolls.

Figure 6 is a detail showing the operating end of the said rolls in elevation with parts omitted.

Figure 7 is a plan view showing an enlarged detail of the rear corner of the machine through which the crowns with the liners therein are fed to the assembling machine.

Figure 8 is a detail showing a cross section through the trough in which the caps are held before being released to the conveyor.

Figure 11 is a detail showing a section through the crown feeding trough, and also showing the trigger for preventing crowns entering the machine except when desired.

Figure 12 is a detail showing a cross section through the conveyor showing the comb or toothed bar for holding the crowns in the position in which they receive the adhesive, and also showing the means for raising this bar.

Figure 1:
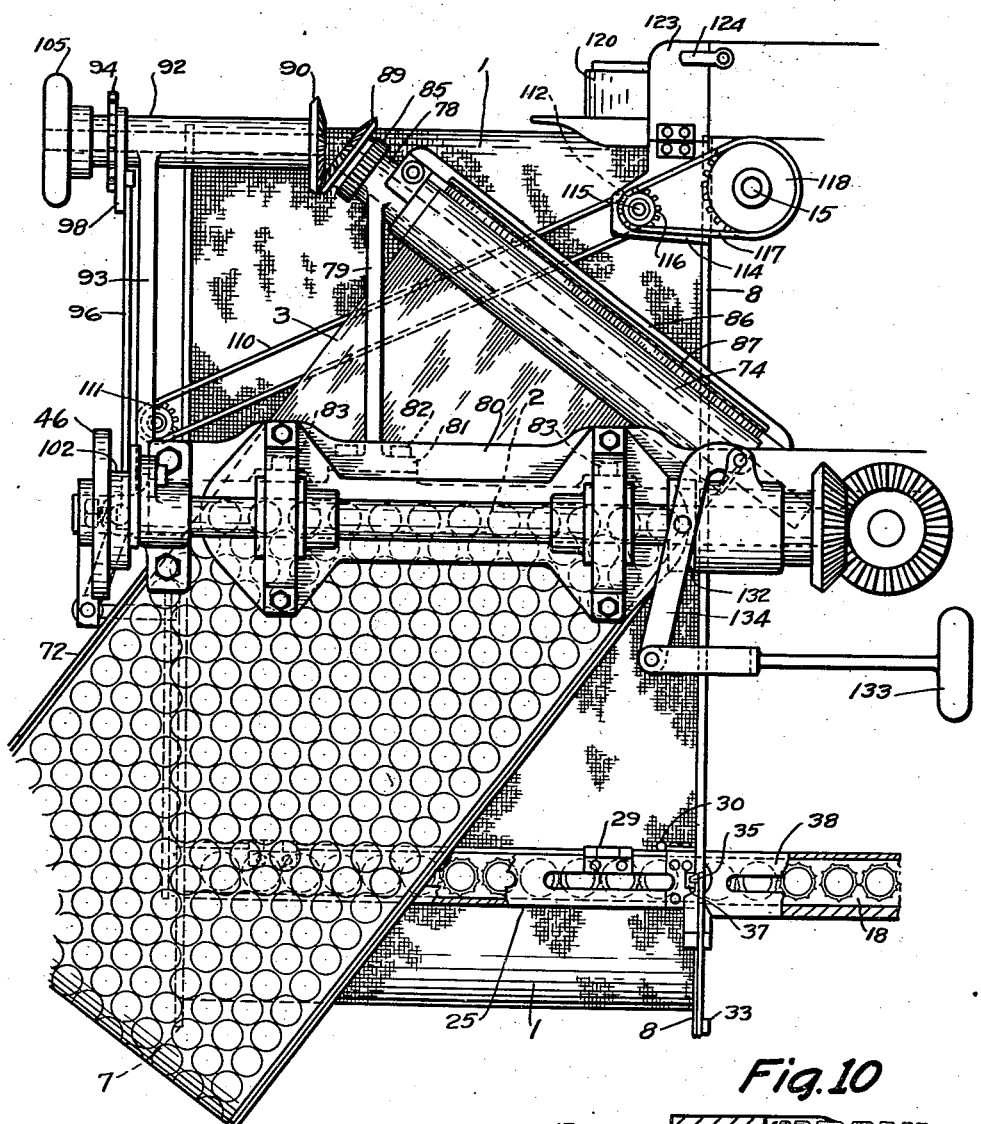
Figure 1 is a general plan view of the machine with parts omitted and with parts broken away.
Figure 10:
Figure 10 is a detail showing a cross section of the toothed bar with one of the caps shown therein.
Figure 9:
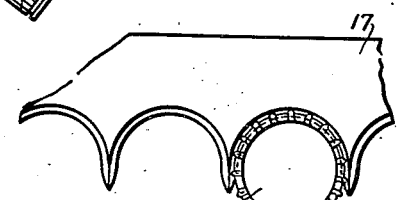
Figure 9 is a detail showing a section of the toothed bar in which the caps may be held.

In the drawings the machine is shown as it may be made wherein numeral 1 indicates the conveyor, numeral 2 the plungers, and numeral 3 a sheet of adhesive material from which the liners are stamped.

The conveyor consists of a continuous belt, which is indicated by the numeral 1 which may be made of canvas or any material and the belt is mounted upon a roller 4 which forms a head pulley and a similar roller 5 forming a tail pulley at the opposite end. The roller 5 is mounted in slots 6 in side members 7 and 8 which form the foundation of the frame of the machine, and the roller is provided with a shaft 9, the ends of which are held in bearings 10 and 11 which may be held outward by take-up screws 12, as shown in Figure 2. These screws may be adjusted to regulate the tension on the belt, however it will be understood that any suitable take-up may be used. The pulley 4 at the opposite end is mounted upon a shaft 13 which may be rotated through bevel gears 14 by a vertical shaft 15 from an assembling machine to which the device may be attached, or by any suitable means. This belt, or conveyor, is continuously driven so that the crowns, which are indicated by the numeral 16, are continuously held against the toothed bar 17, as shown in Figure 5. The conveyor may, however, be driven by any other means and may operate continuously or intermittently, as may be desired.

The caps are fed to the machine by a small conveyor 18 to which the caps are supplied from a cap feeder, as shown in my prior patent with the Number 1,932,529. This conveyor may be made as shown in Figure 4 with a pulley 19 positioned adjacent the side of the conveyor 1, a pulley 20 positioned below the trough of the feeder, and with idler pulleys 21 and 22 positioned below the conveyor to provide means for taking up the length thereof. The pulley 22 may be mounted upon an arm 23 that is resiliently held by a spring 24 to keep the belt 18 in tension continuously. It will be appreciated, however, that any means may be used for taking up the length of this belt, and also that any other means may be used for feeding the caps to the machine or to the trough 25 which extends across the belt of the conveyor 1.

This trough may be made as shown in Figure 8 with an angular shaped section having an upper surface 26 and a depending flange 27 at the rear, and also a hinged side 28 at the front which is attached to the section 26 by hinges 29. This side 28 is adapted to be raised to the position indicated by the dotted lines to permit caps to escape from the trough when desired. This side 28 is also provided with an arm 30 which is attached to one end thereof and which extends upward, as shown in Figure 2, to a position below a cross member 31 which is pivotally mounted at the point 32 on an upright 33 which extends upward from the side 8 of the main frame of the conveyor 1, and it will be noted that as the side 28 is moved upward to the position shown in dotted lines, the upper end 34 of the member 30, which extends under the member 31, as shown in Figure 11, will move downward and permit the lower end 35 of the trigger 36 to drop into the trough 25 through an opening 37, as shown in Figure 1, thereby preventing caps passing into the trough 25 when the side 28 is raised to the position shown in dotted lines. However, as soon as this side returns to the vertical position, the arm 34 will be raised, and this in turn will raise the member 31 and thereby raise the trigger 36 out of the trough so that the caps may continue to pass from the conveyor 18 through an opening in the side 8 to the trough 25. It will be appreciated that the caps are held on the conveyor 18 in a trough 38 on the upper side thereof, and through which the belt 18 passes. It will be appreciated, however, that any other means may be used for holding the crowns in line upon the conveyor 1, and also that any other means may be used for feeding the crowns to the trough or conveyor. The side 28 of the trough 25 is provided with an arm 39 at one end which extends over the side plate 7 of the conveyor 1, as shown in Figure 2, and this may be moved downward by a plurality of levers from a cam on the shaft which also operates the plungers when it is desired to release the crowns.

A shaft 40 is positioned directly above the plungers 2, and this may be operated by bevel gears 41 and 42 from a vertical shaft 43 which may be rotated from the assembling machine in combination with which this device is used, or by any suitable means. The shaft 40 is held in bearings 44 and 45, and the opposite end is provided with a cam 46 which has a projection 47 on the surface thereof that engages a roller 48 in an arm 49 on a vertical shaft 50 which is slidable in a bearing 51, and it will be noted that the lower end of the shaft 50 extends downward and engages a lever 52 which is pivotally mounted on the side 7 through a pin 53. The outer end of the lever 52 is pivotally connected by a link 54 to the arm 39, as shown in Figure 2, and the outer end of this lever is resiliently held upward by a spring 55 as shown. It will be noted that as the projection on the cam 46 moves the shaft 50 downward this moves the lever 52 downward to the position shown in dotted lines, and this movement turns the side 28 of the trough 25 to the position shown in dotted lines so that the caps may be released from the trough. At the same time, and with the same movement, the opposite end of the lever 52 raises the comb or toothed bar 17 through bolts 56 so that the crowns under the plungers may be released at the same time. The bolts 56 are mounted in members 57 and are provided with springs 58 to draw the bar 17 downward after the lever 52 has returned to the position shown. It will be noted in Figure 12 that the bar 17 extends continuously across the belt 1 and both ends thereof are attached to the bolts 56 through the members 57, and both ends are raised at the same time by the ends of the levers 52 which are fixedly mounted on the shaft 53 which also extends across the frame. The levers 52 are operated to raise the ends of the bar 17 after the plungers have dropped liners in the crowns and, as hereinbefore explained, with the same movement additional crowns are released from the trough 25, however the member 17 is drawn downward into place by the springs before the crowns reach this point.

The plungers 2 are attached to a plate 59, which extends across the machine, by screws 60, as shown in Figure 5, and on the upper surface of the plate 59 are yokes 61 having eccentrics 62 mounted in sliding blocks 63 therein, and the upper ends are provided with bars 64 forming closures. The eccentrics 62 are rigidly attached to the shaft 40, and it will be noted that as the shaft rotates, the blocks 63 will slide back and forth and the plungers will be raised and lowered. The plungers are slidably mounted in a cross member 65 having openings 66 therein corresponding with the plungers, and at the lower end of this member is a flange 67 having a slot 68 therein through which the strip of material 3 from which the adhesive pieces are stamped passes, as shown in Figure 5. This strip of adhesive material passes through the lower end of the member 65, and is so positioned that as the plungers 2 move downward they will stamp pieces therefrom and these pieces will drop directly downward through openings 69 in the lower part thereof and into caps 16 held by the member 17 as shown. The lower end of the member 67 is provided with a guard 70 to guide the caps downward into their respective sockets in the bar 17, and the forward side of the member 68 is provided with cleats 71 adapted to hold a trough 72 extending outward diagonally across the front of the machine, as shown in Figure 1, and adapted to convey the punched strip of material remaining after the discs have been punched therefrom over the side of the machine.

The sheet of material 3 may be rosin or any suitable adhesive that may be supplied in sheet form which may become sticky by heat to glue the cork discs into the crowns. This material is supplied in rolls, and the rolls are mounted on a spool 73 from which the sheet is fed downward through feed rollers 74 and 75. The roller 74 is provided with a rubber coating, however it will be understood that any material providing a friction surface may be used. This roller is mounted upon a shaft 76, the inner end of which is held in a bearing 77, as shown in Figure 5, and the outer end in a bearing 78 which is supported by an arm 79 from the rear section 80 of the supporting frame, as shown in Figures 1 and 5. The inner end of the arm 79 is provided with a flange 81 that is held to the member 80 by bolts 82. It will also be noted that the member 65 is bolted to the member 80 by cap screws 83, as shown in dotted lines in Figures 1 and 5. It will be understood, however, that these parts may be supported in any other manner, or by any means. The roller 75 is positioned directly under the roller 74, and this is driven by a small gear 84 which meshes with a gear 85 on the shaft 76 of the roller 74. A guard 86 is also positioned above the roller 74, as shown in Figure 5, which is provided with a slot 87 through which the strip of material passes, and this guard is held upward from the bearing 78 by posts 88, one of which is shown in Figure 5. This guard may, however, be supported in any other manner, and may be of any shape or design. The roller 74 is driven through bevel gears 89 and 90, the gear 89 being mounted on the end of the shaft 76, and the gear 90 mounted on the end of a shaft 91 in a bearing 92 which is supported from the end of the frame 80 by an arm 93, as shown in Figures 1 and 2. The shaft 91 is provided with a ratchet wheel 94 by which it is intermittently rotated from the shaft 40 through a curved lever 95, a bar 96 and a pawl 97. The pawl 97 is pivotally mounted on a member 98 that is free to move back and forth on the shaft 91, and the member 98 is also pivotally connected to the end of the bar 96 through a pin 99 as shown. The opposite end of the bar 96 is pivotally attached to the lever 95 through a pin 100, and the lever 95 is provided with a roller 101 which is engaged by a cam 102 on the shaft 40, and it will be noted that as the cam 102 engages the roller 101 it will push the bar 96 outward and thereby rotate the shaft 91 in a counter-clockwise direction by forcing the pawl 97 against the teeth of the ratchet wheel 94. As soon as the projection 102 has passed off the roller 101 the pawl and operating mechanism thereof will be returned to the position shown by a spring 103, one end of which is connected to the member 98 and the other end of which is connected to a projection 104 on the arm 93. The outer end of the shaft 91 may be provided with a hand wheel 105 so that the roller 74 may be turned to adjust the position of the strip of material 3 by hand if desired. It will be understood that this is only one method of intermittently operating the feed roller of the strip of material, and it will be understood that it may be operated in any other manner or by any other means. It will be noted in Figure 3 that the outer end of the member 65 is supported from the side member 7 of the frame through a post 106, to which it is connected by a flange 107, and the lower end of the post is attached to the frame by a brace 108 and also to a cross member 109 extending under the machine. It will be appreciated that the design of the frame is immaterial as the parts may be connected and supported in any other manner or by any other means.

The device is provided with a small cross belt or chain 110 which is mounted on wheels 111 and 112 at the respective ends thereof, and with this member rotating in the direction of the arrow shown in Figure 7, it will move the crowns over toward one side of the conveyor 1 from which point they will be fed to an assembling machine in combination with which this device may be used. The wheel 111 is supported by a bracket 113 from the side member 7 of the conveyor frame, as shown in Figure 2, and the opposite end with the wheel 112 is supported in a bracket 114 extending from the plate 8 at the opposite side of the frame. The wheel 112 is mounted on a vertical shaft 115, the upper end of which is provided with a sprocket or other driving element 116 which may be driven by a chain or belt 117 from a pulley 118 on the vertical shaft 15 which, as hereinbefore stated, may be driven from the assembling machine, or by any means. The conveying means 110 will move the caps toward the side of the machine, as shown in Figure 7, and at this point they will pass into a trough 119 from where they will pass to a belt conveyor 120 which will convey the crowns in toward an assembling machine the edge of which is indicated by a line 121 through a chute 122. The end of the chute may be provided with a hinged cover 123 with a spring clip 124 which is pivotally mounted on a pin 125 and adapted to be moved to one side when it is desired to raise the cover 123 to open the chute. The crowns shown in Figure 7 are shown with liners 126 therein, and it will be understood that these liners have been stamped from the sheet of material 3 by the plungers 2. It will be understood that any other means may be used for moving the crowns across the conveyor to the chute 119 through which they will be fed to the assembling machine, and any other means may be provided for feeding the crowns with the adhesive therein to the assembling machine. The different gears and other parts may also be provided with suitable covers and plates for protecting the parts thereof. These parts have been purposely omitted from the drawings in order to illustrate the working parts to better advantage.

The roll of sheet material 3 from which the liners are stamped is held upon the spool 73 which is freely held in arms 127, and this material passes downward through the feed rollers and then through a guide consisting of two plates 128 and 129 to the opening 68 in the base 67 of the member 65, and then the plungers, which are vertically slidable in the member 65 and held in position by guide rods 130 which are also vertically slidable in bearings 131 punch the parts from the material and feed them into the crowns, and then the perforated material passes out of the machine whereas the crowns are conveyed backward and fed to an assembling machine after which the cycle of operation is repeated. The belt 1 may run continuous, however the plungers may be controlled by a clutch 132 on the shaft 40, and this may be operated by a handle 133 which is connected to a yoke 134, as shown in Figure 1. It will be understood that the handle may extend to any point, and may be operated by any means.

It will be understood that other changes may be made in the construction without departing from the spirit of the invention. One of which changes may be in the use of other means for feeding the crowns to the conveyor 1, another may be in the use of other means for positioning the crowns below the plungers, another may be in the use of other means for reciprocating the plungers, another may be in the use of other means for intermittently feeding the adhesive material to the plungers, another may be in the use of other means for separating the adhesive material and depositing the same into crowns, and still another may be in the use of other means for conveying the caps with the adhesive therein to the assembling machine.

The construction will be readily understood from the foregoing description. This device may be provided as a separate and independent unit and used in combination with a crown and cork disc assembling machine, and it will be noted that the crowns may readily be fed to this device which places adhesive in them and then feeds the crowns with the adhesive therein to the assembling machine. The device may be continuously operated and the speed thereof synchronized with that of the assembling machine so that a sufficient number of crowns may be supplied to correspond with the number of crowns used by the assembling machine.

Having thus fully described the invention, what I claim as new and desire to secure by Letters Patent, is:

1. A machine for depositing adhesive discs in bottle crowns comprising a conveyer consisting of a continuous belt horizontally positioned, a crown feeding trough extending across the head end of said conveyer, means feeding bottle crowns to said trough, means releasing said bottle crowns from one side of said trough, permtting them to travel on said conveyer, means resting said crowns and holding them at a point about midway of said conveyer, a plurality of plungers positioned above the positions in which the crowns are held about midway of said conveyer, means feeding an adhesive material between said plungers and crowns, means forcing said plungers downward to feed said adhesive material into said crowns, means releasing said crowns as the plungers recede and means feeding said crowns from said conveyer to another conveyer after the adhesive members have been placed therein.

2. A device as described in claim 1 in which the adhesive liners are stamped from sheet material.

3. A device as described in claim 1 in which the adhesive liners are deposited in a plurality of crowns simultaneously.

4. A device as described in claim 1 in which the adhesive liners are stamped from sheet material and the sheet material is fed to the device with an intermittent movement.

5. In a device as described in claim 1 in which the adhesive liners are stamped from sheet material, means feeding the sheet material through the device in such a manner that substantially all of said material is utilized.

6. A machine as described in claim 1 characterized in that the holding means midway of the conveyer consists of a toothed bar having recesses between the teeth for receiving the crowns and in which they are held to receive the adhesive.

7. A machine as described in claim 1 characterized in that the holding means midway of the conveyer consists of a toothed bar having recesses between the teeth for receiving the crowns and in which they are held to receive the adhesive, and also in that means is provided for raising said toothed bar to provide the releasing means for said crowns after the adhesive has been placed therein.

8. A machine as described in claim 1 characterized in that the releasing means at one side of said trough is provided with a hinged side raised by the same mechanism that operates the plungers.

9. A machine as described in claim 1 characterized in that a stop is provided for preventing crowns passing into the trough during the time that the crowns are released from said trough.

10. A machine as described in claim 1 characterized in that the plungers are mounted in a cross head and operated by a cam shaft positioned directly above the plungers.

11. A machine as described in claim 1 characterized in that the plungers are mounted in a cross head and operated by a cam shaft positioned directly above the plungers, and further characterized in that the material from which the adhesive is punched is fed by said cam shaft through an intermittent motion.

12. A machine as described in claim 1, characterized in that a cross belt is provided across the conveyer belt for feeding the crowns from the holding means midway of said conveyer toward one side thereof.

13. A machine as described in claim 1 characterized in that the adhesive is provided in sheet form and the sheet from which the adhesive members are punched is fed from a supply roll to a position under the plungers by feed rollers intermittently operated.

14. A machine as described in claim 1, characterized in that the adhesive is provided in sheet form and the sheet from which the adhesive members are punched is fed from a supply roll to a position under the plungers by feed rollers intermittently operated, and characterized in that the adhesive and the mounting and feeding means therefor is angularly positioned in relation to the machine.

15. A machine for supplying adhesive discs to bottle crowns comprising a horizontal conveyer, means positioning the crowns across the head end of the conveyer, means releasing the crowns at regular intervals, a plurality of plungers positioned across the conveyer, a member having a plurality of openings corresponding with said plungers positioned below the plungers and adapted to receive said plungers, means for feeding a sheet of adhesive material positioned below the openings below the plungers with an intermittent motion, means retaining said crowns below the openings below the plungers, means operating said retaining means to release said crowns, and means feeding said crowns to a crown and disc assembling machine.

16. In a device as described in claim 15, means stamping the liners from a sheet of adhesive material and directly depositing said liners into said crowns in the receiving position.

17. In a device as described in claim 15, means releasing the lined and unlined crowns instantaneously.

18. In a device as described in claim 15, means for releasing the lined and unlined crowns instantaneously, and also means for preventing additional crowns being fed to the device during the releasing operation.

19. A device as described in claim 15 in which the crowns rest upon a flat conveyer throughout their movement through said device.

20. A device as described in claim 15 in which the releasing means for the lined crowns is provided with means for aligning said crowns with the adhesive depositing means.

21. A device as described in claim 15 in which the adhesive liners are stamped from sheet material by plungers aligned between extensions on the lined crown releasing means.

22. In a device as described in claim 15 in which the adhesive liners are stamped from sheet material, means feeding the sheet material with an intermittent movement timed to correspond with the lined and unlined crown releasing and feeding means.

23. In a device as described in claim 15 in which the adhesive liners are stamped from sheet material, means for positioning and feeding said sheet material to enable substantially all of said material to be utilized.

BERTHOLD NAGY.